(No Model.)

W. R. BAKER.
HARVESTER.

No. 324,745. Patented Aug. 18, 1885.

WITNESSES

INVENTOR
William R. Baker,
By his Attorneys

UNITED STATES PATENT OFFICE.

WILLIAM R. BAKER, OF CHICAGO, ILLINOIS.

HARVESTER.

SPECIFICATION forming part of Letters Patent No. 324,745, dated August 13, 1885.

Application filed October 6, 1884. (No model.)

*To all whom it may concern:*

Be it known that I, WILLIAM R. BAKER, of Chicago, in the county of Cook and State of Illinois, have invented certain new and useful Improvements in Harvesters, of which the following is a specification.

My invention relates to the mechanism for adjusting the main wheel of the harvester, and has for its object to fix this wheel positively in its adjusted position.

Of late years the axle supporting the main wheel has been provided at each end with fixed pinions, which engage with and turn upon segment-racks formed in upright bridle-standards fixed to the lateral bars of the wheel-frame. A sheave pinned to the axle receives one end of a chain, the other end of which is wound upon a drum on one of the longitudinal sills of the harvester-frame—usually the rear sill—and when this drum is turned in one direction or the other the axle is revolved, either by the stress brought upon the chain as it is taken in or by the pressure of the harvester-frame as said chain is let out, so that the position of the wheel is altered and the frame either raised or lowered relatively thereto. In practice this mechanism, while serving its purpose well, fails to hold the wheel rigidly in position under all the contingencies of the field, and it will sometimes travel a little distance up or down the rack under the joltings experienced on uneven ground. To remedy this, locking-dogs have been used, closing into the rack and preventing the frame from sinking; but these afforded a rigid lock in one direction only and permitted the frame to move in the other.

In my invention I propose to place upon the axle, or to form integral with the sheave thereon, a disk with a series of circumferential perforations, and connect the chain with this disk by means of a rod or link hooked at each end, one of these hooks taking into a perforation on the disk and the other into one of the chain-links, thus preventing the chain from unwinding or winding up.

Figure 1:
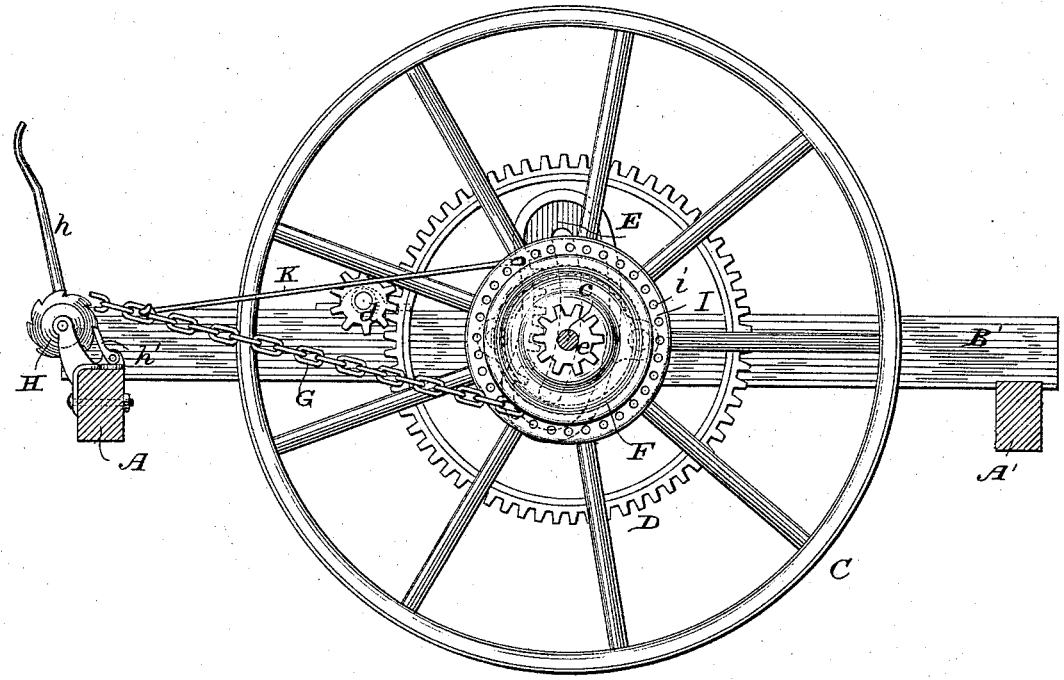
Figure 2:
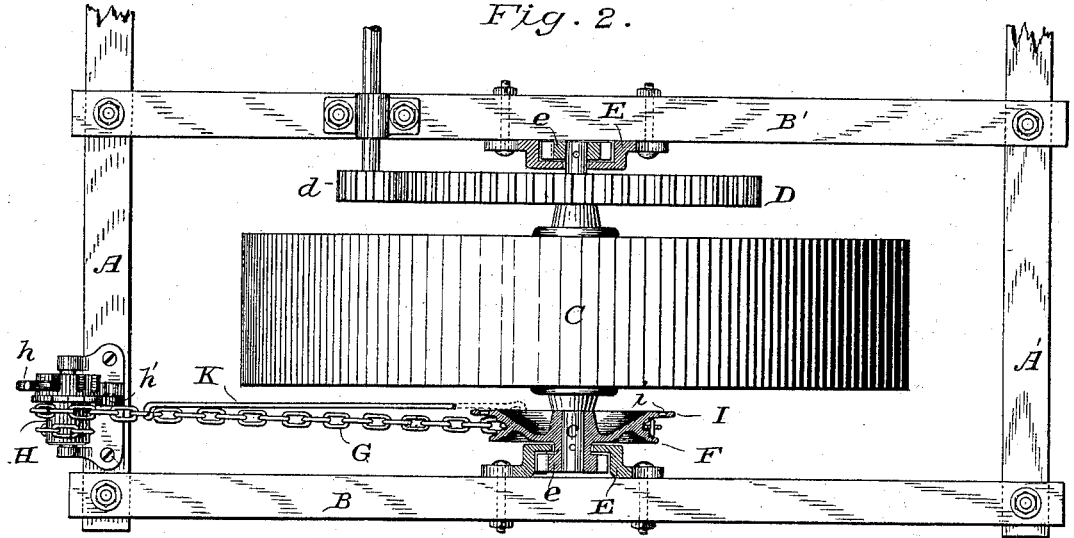

In the drawings, Figure 1 is a side elevation of a main wheel and adjusting devices embodying my invention, with so much of the wheel-frame shown as is necessary to an understanding thereof; and Fig. 2 is a top plan view of the same.

A is the rear sill of the harvester, and A' the front sill. B and B' are the lateral timbers of the wheel-frame, and C is the main wheel, running loosely on its axle $c$, and carrying the usual gear, D, by which the prime pinion $d$ is driven and motion communicated to the harvester.

Bolted fast to the lateral timbers are segment rack-standards E, which receive the pinions $e$, riveted to the ends of the axle, and support said axle thereby. A sheave, F, is mounted upon the axle to turn therewith, between the main wheel and one of the rack-standards, advisably the outer one. This sheave may be formed independently of the pinion at that end of the axle; but I have shown it herein as cast integral with said pinion, and deem this the preferable mode, as a single rivet will hold both to the axle, and time and labor in assembling the parts are thus saved. The sheave receives one end of a chain, G, which is wrapped about it in such manner that as the harvester-frame descends upon the wheel the chain will be wound up upon the sheave, and as the chain is forcibly unwound it will roll the axle in such direction that the frame will be lifted. The other end of the chain is wound upon a drum, H, supported upon the rear sill, and a ratchet-lever, $h$, or other suitable device, serves to turn this drum to wind it or let out the chain. A pawl, $h'$, taking into a ratchet-disk upon the drum, locks it against the stress of the chain, so as to prevent this from unwinding. Between the drum and the sheave there is necessarily a considerable length of chain, which will afford more or less slack, so that the adjustment is never entirely rigid; and, besides this, as before explained, the chain can unwind from the sheave, unless some locking device distinct from the pawl upon the drum is employed. To prevent this unwinding or accidental winding up, I place a disk, I, upon the axle, casting it for convenience and economy in one piece with the sheave, and with the pinion at that end of the axle. This disk has a series of circumferential perforations, $i$, arranged near together, and adapted to receive a hook at one end of the rod K, which at the other end has a second hook so shaped and arranged that it may be caught into one of the chain-links. The hooked rod should be of sufficient length to extend from the sheave nearly to the drum, and be hooked into the chain close thereto, so that there shall be practically no slack length of the chain between the drum and rod.

The effect of this arrangement is, that whenever there is any tendency of the chain to unwrap from the sheave the rod which is hooked on that side of the sheave opposite where the chain leaves it will act in opposition and prevent the sheave from turning.

I have described my improvement in connection with the form of adjusting-chain ordinarily used—that is, a chain having one end wound upon the sheave and the other end upon the drum. A chain belt is, however, sometimes used, the sheave and drum then being provided with sprocket-teeth. It is evident that the hooked rod or link can be employed quite as efficaciously with such a belt as with the form herein depicted.

I claim as my invention—

1. The combination, with the main wheel and its axle, of the sheave, adjusting-chain, and hooked rod or link.

2. The combination, with the main wheel and its axle, of the sheave, the adjusting-chain, the circumferentially-perforated disk, and the hooked rod or link.

3. The sheave and perforated disk formed as a single casting.

4. The sheave, perforated disk, and pinion cast integral with each other.

WILLIAM R. BAKER.

Witnesses:
JOHN V. A. HASBROOK,
PAUL ARNOLD.